United States Patent
Nishida et al.

(10) Patent No.: US 10,483,017 B2
(45) Date of Patent: Nov. 19, 2019

(54) FLAME RETARDANT RESIN COMPOSITION, CABLE USING SAME AND OPTICAL FIBER CABLE

(71) Applicant: FUJIKURA LTD., Tokyo (JP)

(72) Inventors: Nao Nishida, Tokyo (JP); Seiichi Taira, Chiba (JP); Shoichiro Nakamura, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 15/506,304

(22) PCT Filed: Aug. 25, 2015

(86) PCT No.: PCT/JP2015/073771
§ 371 (c)(1),
(2) Date: Feb. 24, 2017

(87) PCT Pub. No.: WO2016/031789
PCT Pub. Date: Mar. 3, 2016

(65) Prior Publication Data
US 2017/0271048 A1  Sep. 21, 2017

(30) Foreign Application Priority Data
Aug. 25, 2014 (JP) ................. 2014-170406

(51) Int. Cl.
| | | |
|---|---|---|
| *H01B 7/295* | (2006.01) | |
| *C08K 3/26* | (2006.01) | |
| *C08K 5/09* | (2006.01) | |
| *C08L 23/06* | (2006.01) | |
| *C08L 23/26* | (2006.01) | |
| *C08L 83/04* | (2006.01) | |
| *G02B 6/44* | (2006.01) | |
| *H01B 3/00* | (2006.01) | |
| *H01B 3/44* | (2006.01) | |
| *H01B 3/46* | (2006.01) | |
| *H01B 7/00* | (2006.01) | |
| *H01B 7/02* | (2006.01) | |
| *H01B 3/42* | (2006.01) | |

(52) U.S. Cl.
CPC .............. *H01B 7/295* (2013.01); *C08K 3/26* (2013.01); *C08K 5/09* (2013.01); *C08L 23/06* (2013.01); *C08L 23/26* (2013.01); *C08L 83/04* (2013.01); *G02B 6/44* (2013.01); *G02B 6/4429* (2013.01); *H01B 3/00* (2013.01); *H01B 3/427* (2013.01); *H01B 3/44* (2013.01); *H01B 3/46* (2013.01); *H01B 7/00* (2013.01); *H01B 7/02* (2013.01); *C08K 2003/265* (2013.01); *C08L 2207/062* (2013.01); *C08L 2207/066* (2013.01)

(58) Field of Classification Search
CPC ...... H01B 3/441; H01B 3/004; C08L 23/0815
See application file for complete search history.

(56) References Cited

U.S. PATENT DOCUMENTS

| | | | | |
|---|---|---|---|---|
| 4,767,580 | A * | 8/1988 | Shingo | .............. C08L 23/02 264/41 |
| 6,221,928 | B1* | 4/2001 | Kozma | .............. C08F 255/00 521/134 |
| 6,429,246 | B1 | 8/2002 | Rous | |
| 6,755,995 | B1 | 6/2004 | Hasegawa et al. | |
| 7,801,404 | B2* | 9/2010 | Pavan | .............. C08L 23/0869 385/100 |
| 2013/0220667 | A1* | 8/2013 | Millan Perez | .......... C08L 23/08 174/120 SR |
| 2014/0234621 | A1 | 8/2014 | Iwata et al. | |
| 2015/0310962 | A1 | 10/2015 | Touge | |
| 2015/0318076 | A1 | 11/2015 | Iwata et al. | |

FOREIGN PATENT DOCUMENTS

| | | | |
|---|---|---|---|
| CN | 1152471 | A | 6/1997 |
| CN | 103700439 | A | 4/2014 |
| CN | 103748176 | A | 4/2014 |
| EP | 0393959 | * | 4/1990 |
| JP | H03-28271 | A | 2/1991 |
| JP | H09-169918 | A | 6/1997 |
| JP | H09-183870 | A | 7/1997 |
| JP | H10-7913 | A | 1/1998 |
| JP | 2000-248121 | A | 9/2000 |
| JP | 2005-096320 | A | 4/2005 |
| JP | 2012-149187 | A | 8/2012 |
| JP | 5167401 | B1 | 3/2013 |
| JP | 2014-084437 | A | 5/2014 |
| JP | 2014-094969 | A | 5/2014 |

(Continued)

OTHER PUBLICATIONS

Kirk-Othmer Encyclopedia of Chemical Technology, John Wiley and Sons, Oct. 2015.*
International Search Report issued in corresponding application No. PCT/JP2015/073771 dated Nov. 17, 2015 (5 pages).
Written Opinion of the International Searching Authority issued in corresponding application No. PCT/JP2015/073771 dated Nov. 17, 2015 (5 pages).
Taiwanese Official Action issued in application No. 104127632 dated Aug. 3, 2016 (6 pages).
Japanese Official Action issued in application No. 2014-170406 dated Jul. 28, 2015 (2 pages).

(Continued)

*Primary Examiner* — Gregory Listvoyb
(74) *Attorney, Agent, or Firm* — Osha Liang LLP

(57) ABSTRACT

A flame retardant resin composition including a base resin including 18 to 85% by mass of a high density polyethylene, 9 to 69% by mass of a low density polyethylene, and 3 to 25% by mass of an acid-modified polyolefin compound, and 25 parts by mass to 110 parts by mass of calcium carbonate particles, more than 1 part by mass to 10 parts by mass of a silicone-based compound, and 2 parts by mass to 20 parts by mass of a fatty acid-containing compound, each on the basis of 100 parts by mass of the base resin.

9 Claims, 1 Drawing Sheet

(56) References Cited

FOREIGN PATENT DOCUMENTS

| | | |
|---|---|---|
| JP | 5533693 B2 | 6/2014 |
| JP | 2014-125575 A | 7/2014 |
| JP | 2014-132530 A | 7/2014 |
| WO | 2013/062077 A1 | 5/2013 |
| WO | 2014/103904 A1 | 7/2014 |
| WO | 2014/106928 A1 | 7/2014 |

OTHER PUBLICATIONS

Japanese Official Action issued in application No. 2015-544256 dated Nov. 17, 2015 (3 pages).
Extended European Search Report issued in corresponding European Application No. 15836813.4 dated Mar. 16, 2018 (6 pages).
Office Action issued in counterpart Chinese Application No. 201580045449.2 dated Sep. 5, 2018 (7 pages).

\* cited by examiner

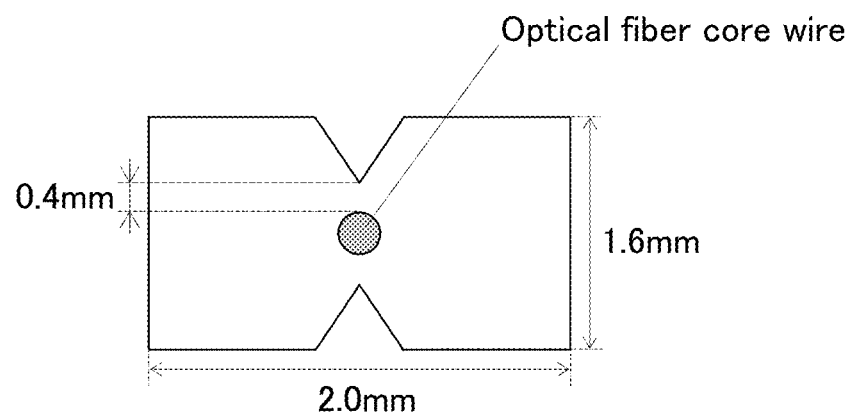

FLAME RETARDANT RESIN COMPOSITION, CABLE USING SAME AND OPTICAL FIBER CABLE

TECHNICAL FIELD

The present invention relates to a flame retardant resin composition, a cable using the same, and an optical fiber cable.

The contents of Japanese Patent Application No. 2014-170406, filed in Japan on Aug. 25, are incorporated herein by reference in the designated countries in which the incorporation by reference is accepted.

BACKGROUND

As a resin used for the covering of electric wires, etc., polyvinyl chloride resin (PVC) is widely used conventionally. The polyvinyl chloride resin has excellent workability, and excellent properties such as chemical resistance and flame retardancy, while it has the disadvantage of generating a toxic gas during combustion.

Contrastingly, as the resin used for the covering of electric wires, etc., the flame retardant resin composition formed by adding a non-halogen-based flame retardant to polyolefin resin which is chemically stable and easily processed has been investigated. For example, Patent Document 1 discloses a flame retardant resin composition which contains polyolefin resin, calcium carbonate particles which are blended at a ratio of 10 parts by mass or more with respect to 100 parts by mass of the polyolefin resin, a silicone-based compound which is blended at a ratio of more than 1 part by mass, and a fatty acid-containing compound which is blended at a ratio of more than 3 part by mass, wherein the calcium carbonate particles have an average particle diameter of 0.7 μm or more.

PRIOR ART DOCUMENT

Patent Document

Patent Document 1: JP 2014-94969 A

SUMMARY

According to the flame retardant resin composition described in Patent Document 1, while ensuring excellent mechanical properties, it is possible to ensure also excellent flame retardancy. However, for using the flame retardant resin composition described in Patent Document 1 as a jacket of the cable, hardness durable to the external scratches and impact, easy tearing property capable of easily tearing the jacket of the cable for processing the end, and low-temperature resistance without cracking in the jacket of the cable at a low temperature are not sufficient.

One or more embodiments of the present invention provide a non-halogen-based flame retardant resin composition which is high in hardness, excellent in easy tearing property, low temperature resistance, and flame retardancy, and a cable using this resin composition, and an optical fiber cable.

[1] In one or more embodiments a flame retardant resin composition comprises a base resin which contains 18 to 85% by mass of high density polyethylene, 9 to 69% by mass of low density polyethylene, and 3 to 25% by mass of an acid-modified polyolefin compound and, with respect to 100 parts by mass of the base resin, 25 parts by mass or more and 110 parts by mass or less of calcium carbonate particles, more than 1 part by mass and 10 parts by mass or less of a silicone-based compound, and 2 parts by mass or more and 20 parts by mass or less of a fatty acid-containing compound are blended.

[2] In one or more embodiments, it may be configured that the acid-modified polyolefin compound is maleic anhydride modified ethylene-α olefin copolymer.

[3] In one or more embodiments, it may be configured that the maleic anhydride modified ethylene-α olefin copolymer is maleic anhydride modified ethylene-1-butene copolymer.

[4] In one or more embodiments, it may be configured that density of the high density polyethylene is 945 kg/m$^3$ or more, and the density of the low density polyethylene is 880 kg/m$^3$ or more and 925 kg/m$^3$ or less.

[5] In one or more embodiments, it may be configured that the silicone-based compound is a silicone gum.

[6] In one or more embodiments, it may be configured that the fatty acid-containing compound is magnesium stearate.

[7] An optical fiber cable according to one or more embodiments of the present invention comprises an optical fiber and an insulating layer covering the optical fiber, the insulating layer is composed of the flame retardant resin composition of one or more embodiments of the present invention.

[8] A cable according to one or more embodiments of the present invention comprises a conductor, an insulating layer covering the conductor, the insulating layer is composed of the flame retardant resin composition of one or more embodiments of the present invention.

According to one or more embodiments of the present invention, the non-halogen-based flame retardant resin composition which is high in hardness, excellent in easy tearing property, low temperature resistance, and flame retardancy, and a cable using this resin composition, and an optical fiber cable are provided.

BRIEF DESCRIPTION OF DRAWINGS

FIG. 1 is a cross-sectional view of a sample of an optical fiber cable according to an Example of the invention.

DESCRIPTION OF EMBODIMENTS

Hereinafter, one or more embodiments of the present invention will be described.

A flame retardant resin composition of the present embodiment is configured that a base resin which contains 18 to 85% by mass of high density polyethylene, 9 to 69% by mass of low density polyethylene, and 3 to 25% by mass of an acid-modified polyolefin compound where, with respect to 100 parts by mass of the base resin, 25 parts by mass or more and 110 parts by mass or less of calcium carbonate particles, more than 1 part by mass and 10 parts by mass or less of a silicone-based compound, and 2 parts by mass or more and 20 parts by mass or less of a fatty acid-containing compound are blended.

<Base Resin>

The base resin contains 18 to 85% by mass of the high-density polyethylene, 9 to 69% by mass of the low density polyethylene, and 3 to 25% by mass of the acid-modified polyolefin compound.

As the high density polyethylene (HDPE), not particularly limited, but from the viewpoint of obtaining a sufficient blending effect, the density may be 945 kg/m$^3$ or more, or even 950 kg/m$^3$ or more. The content ratio of the high density polyethylene in the base resin may be 18 to 85% by mass, such as 20 to 80% by mass, or 30 to 70% by mass, or 40 to 60% by mass.

By containing the high density polyethylene in the above content ratio, the flame retardant resin composition can be made to have high hardness with excellent impact resistance, etc. If the content of the high density polyethylene is too small, hardness is too lowered, resistance to external scratches and impact decreases. On the other hand, if the content of the high density polyethylene is too large, acceptability of the base resin to the calcium carbonate particles is lowered, low temperature resistance is deteriorated.

As the low density polyethylene (LDPE), not particularly limited, but from the viewpoint of obtaining the sufficient blending effect, the density may be 880 kg/m$^3$ or more and 925 kg/m$^3$ or less, or 900 kg/m$^3$ or more and 920 kg/m$^3$ or less. The content ratio of the low density polyethylene in the base resin may be 9 to 69% by mass, such as 10 to 65% by mass, 20 to 60% by mass, or 30 to 50% by mass.

In the flame retardant resin composition, the low density polyethylene exhibits an effect of reducing the crystallinity of the base resin, along with an acid-modified polyolefin compound later-described, this becomes possible to improve the low temperature resistance. The low density polyethylene also exhibits an effect of increasing acceptability to calcium carbonate particles, along with an acid-modified polyolefin compound later-described. If the content of the low density polyethylene is too small, acceptability of the base resin to the calcium carbonate particles is lowered, low temperature resistance is deteriorated. On the other hand, if the content of the low density polyethylene is too large, hardness is too lowered, resistance to external scratches and impact decreases.

The acid modified polyolefin compound, not particularly limited, for example, includes a partial copolymer, etc. of unsaturated organic acid or unsaturated organic acid esters such as carboxylic acid, carboxylic anhydride, carboxylic acid esters, and carboxylic anhydride esters such as maleic anhydride, acrylic acid, and methacrylic acid, and polyolefin. Concrete examples of the acid modified polyolefin compounds include maleic anhydride modified polyethylene, maleic anhydride modified polypropylene, maleic anhydride modified ethylene-α olefin copolymer, maleic anhydride modified styrene-based elastomer, and maleic anhydride modified ethylene-propylene copolymer, etc. Among them, the maleic anhydride modified ethylene-α olefin copolymer may be used from the viewpoint that the breaking strength and elongation can be improved while ensuring high hardness, excellent easy tearing property, excellent low temperature resistance, and excellent flame retardancy. The maleic anhydride modified ethylene-α olefin copolymer is a copolymer formed by modifying ethylene-α olefin copolymer which has main chain structure consisting of ethylene as main monomer and α olefin as comonomer, with maleic anhydride. Among the maleic anhydride modified ethylene-α olefin copolymer, maleic anhydride modified ethylene-1-butene copolymer may be used. The maleic anhydride modified ethylene-1-butene copolymer is a copolymer formed by modifying ethylene-1-butene copolymer which has main chain structure consisting of ethylene as main monomer and 1-butene as comonomer, with maleic anhydride. As the maleic anhydride modified ethylene-α olefin copolymer, one where main chain structure substantively consists of only ethylene and α olefin and other monomers are not copolymerized is desirable from the viewpoint that the breaking strength and elongation can be appropriately improved. As the maleic anhydride modified ethylene-α olefin copolymer, it suffices that main chain structure is substantially composed of ethylene and α olefin, for example, it may be a copolymer of two or more kinds of α olefins.

The content ratio of the acid-modified polyolefin compound in the base resin may be 3 to 25% by mass, such as 5 to 20% by mass, 5 to 15% by mass, or 5 to 10% by mass.

In the flame retardant resin composition, the acid-modified polyolefin compound is a compound which exhibits an effect of improving the adhesion of the high density polyethylene and the low density polyethylene to the calcium carbonate particles, this becomes possible to improve the acceptability to the calcium carbonate particles of the base resin, as a result, this becomes possible to improve low temperature resistance. If the content of the acid-modified polyolefin is too small, the acceptability of the base resin to the calcium carbonate particles is lowered, low temperature resistance is deteriorated. On the other hand, if the content of the acid-modified polyolefin compound is too large, hardness becomes too low, resistance to external scratches and impact decreases.

The base resin may contain, in addition to the high density polyethylene, the low density polyethylene, and the acid-modified polyolefin compound, the other resin. As the other resin, ethylene-vinyl acetate copolymer resin, ethylene-ethyl acrylate copolymer, or polypropylene, etc. may be mentioned. The content ratio of the other resin in the base resin may be 6% by mass or less, 5% by mass or less, or 3% by mass or less.

<Calcium Carbonate Particles>

The calcium carbonate particles may be any of heavy calcium carbonate or light calcium carbonate. Among them, from the viewpoint of being easily available and low price, the heavy calcium carbonate may be used. The calcium carbonate particles function primarily as a flame retardant. An interface is formed between the calcium carbonate particles and the base resin in the flame retardant resin composition. Therefore, in the case of using the flame retardant resin composition as cable or optical fiber cable applications, when tearing process was conducted to process the end, excellent tearing property can be realized by blending the calcium carbonate particles in the flame retardant resin composition, since the interface is a starting point of tearing.

The average particle diameter of the calcium carbonate particles may be 0.7 µm or more, 1.0 µtm or more, or 1.5 µm or more. If the average particle diameter of the calcium carbonate particle is too small, there is a possibility that the flame retardancy is reduced. If the average particle diameter of the calcium carbonate particle is too large, there is a case in which low temperature resistance is lowed. Therefore, the upper limit of the average particle diameter of the calcium carbonate particle may be 3.6 µm or less, or 2.2 µm or less.

The content of the calcium carbonate particles in the flame retardant resin composition may be 25 parts by mass or more and 110 parts by mass or less with respect to 100 parts by mass of the base resin, such as 30 parts by mass or more and 100 parts by mass or less, 40 parts by mass or more and 100 parts by mass or less, or 50 parts by mass or more and 80 parts by mass or less. If the content of the calcium carbonate particles is too small, easily tearing properties and flame retardancy are lowered. On the other hand, if the content of the calcium carbonate particles is too large, low temperature resistance is deteriorated.

<Silicone-Based Compound>

The silicone-based compound is a compound which functions as a flame retardant aid. As the silicone-based compound, for example, it can be suitably used polyorganosiloxane, etc.

Here, the polyorganosiloxane is a compound which have siloxane bonds as main chain, and organic groups as side chain. The organic groups, for example, include methyl group, vinyl group, ethyl group, propyl group, and phenyl group, etc.

Concrete examples of the polyorganosiloxane include, for example, dimethylpolysiloxane, methylethylpolysiloxane, methyloctylpolysiloxane, methylvinylpolysiloxane, methylphenylpolysiloxane, and methyl(3,3,3-trifluoropropyl)polysiloxane, etc.

The silicone-based compound can be used in the form of silicone powder, silicone gum, silicone oil, or silicone resin. The silicone-based compound may be used in the form of the silicone gum from the viewpoint that the blooming is less likely to occur.

The content of the silicone-based compound in the flame retardant resin composition may be more than 1 part by mass and 10 parts by mass or less with respect to 100 parts by mass of the base resin, such as 2 parts by mass or more and 7 parts by mass or less, or 3 parts by mass or more and 5 parts by mass or less. If the content of the silicone-based compound is too small, the flame retardant resin composition cannot secure sufficient flame retardancy. On the other hand, if the content of the silicone-based compound is too large, the blooming is likely to occur.

The silicone-based compound may be adhered in advance to the surface of the calcium carbonate particles. By doing this, dispersion property of the calcium carbonate particles in the base resin can be more enhanced.

<Fatty Acid-Containing Compound>

The fatty acid-containing compound is a compound which functions as flame retardant aid along with the silicone-based compound described above. The fatty acid-containing compound includes fatty acid or metal salt of fatty acid. Among them, the metal salt of fatty acid may be used. The fatty acid includes, for example, the fatty acid having 12 to 28 carbon atoms. Such fatty acid includes, for example, lauric acid, myristic acid, palmitic acid, stearic acid, tuberculostearic acid, oleic acid, linoleic acid, arachidonic acid, behenic acid, and montanic acid. Among them, stearic acid or tuberculostearic acid may be used. In some embodiments stearic acid may be used from the viewpoint that the effect of improving the flame retardancy can be more remarkable.

The metal constituting the metal salt of fatty acid includes magnesium, calcium, zinc and lead. The metal salt of the fatty acid may be magnesium stearate from the viewpoint that the effect of improving the flame retardancy can be more remarkable.

The content of the fatty acid-containing compound in the flame retardant resin composition may be 2 parts by mass or more and 20 parts by mass or less with respect to 100 parts by mass of the base resin, such as 3 parts by mass or more and 15 parts by mass or less, or 5 parts by mass or more and 10 parts by mass or less. If the content of the fatty acid-containing compound is too small, the flame retardant resin composition cannot ensure sufficient flame retardancy. On the other hand, if the content of the fatty acid-containing compound is too large, the blooming is likely to occur.

The flame retardant resin composition of the present embodiment may further include various compounding agents such as antioxidant, ultraviolet-induced deterioration inhibitor, processing aid, coloring pigment, lubricating agent, and filler such as carbon black as necessary.

The flame retardant resin composition of the present embodiment can be obtained by kneading the high density polyethylene, the low density polyethylene, and the acid-modified polyolefin compound constituting the base resin, the calcium carbonate particles, the silicone-based compound, the fatty acid-containing compound, and various compounding agents used as needed. The kneading can be conducted using, for example, a kneading machine such as a BANBURY mixer, a tumbler, a pressurized kneader, a kneader extruder, a twin screw extruder, or a mixing roll. At this time, from the viewpoint of improving the dispersion property of the silicone-based compound, a master batch (MB) is obtained by kneading a portion of the base resin and the silicone-based compound and these may be kneaded in the state of the master batch (MB).

Since the flame retardant resin composition of the present embodiment has the above mentioned constitution, it has high hardness, excellent easily tearing properties, excellent low temperature resistance, and excellent flame retardancy. Therefore, by utilizing such characteristics, the flame retardant resin composition of the present embodiment is suitable for various insulation layer applications. The flame retardant resin composition of the present embodiment can be suitably used for uses in which treatment for tearing the outer cover is conducted in order to process the ends, such as uses of insulation layer of optical fiber cable comprising an optical fiber and an insulating layer covering the optical fiber, and uses of insulation layer of cable comprising a conductor and an insulation layer covering the conductor.

Therefore, according to the present embodiment, an optical fiber cable comprising an optical fiber and an insulation layer covering the optical fiber, wherein the insulation layer is composed of the flame retardant resin composition of the present embodiment. Such the optical cable includes, for example, optical drop cables, optical indoor cables, etc. According to the present embodiment, a cable comprising a conductor and an insulation layer covering the conductor, wherein the insulation layer is composed of the flame retardant resin composition of the present embodiment. Such the cable includes, for example, various cables such as insulated electric wires, electric wires for electric wiring of electronic equipment, electric wires for automotive, electric wires for equipment, power cords, insulated electric wires for wiring at outdoors, power cables, cables for control, cables for communication, cables for instrumentation, cables for signal, cables for movement, cables for sip, etc.

EXAMPLES

Hereinafter, one or more embodiments of the present invention will be more specifically described with respect to several Examples, but the present invention is not intended to be limited to the following Examples.

Examples 1 to 11 and Comparative Examples 1 to 5

High density polyethylene, low density polyethylene, acid-modified polyolefin, calcium carbonate particles, silicone-based compound, fatty acid-containing compound, and antioxidant were blended in the blending amounts indicated in Tables 1 and 2, and they were kneaded for 15 minutes at 160° C. by a BANBURY mixer. Therefore, a flame retardant resin composition was obtained. In Tables 1 and 2, the unit of the blending amount of various blended components is parts by mass.

As the various blended components, those described below were used.

High Density Polyethylene HDPE: manufactured by Japan Polyethylene Corporation, "NOVATEC HD HD322W", density of 951 kg/m$^3$ Low Density Polyethylene LDPE1: manufactured by Ube-Maruzen Polyethylene Co., Ltd., "UMERIT 0520F", density of 904 kg/m$^3$ Low Density Polyethylene LDPE2: manufactured by Prime Polymer Co., Ltd., "EVOLUE-PSP9018", density of 890 kg/m$^3$ Acid-Modified Polyolefin Acid-Modified PE: , manufactured by Mitsui Chemicals, Incorporated, "TAFMER MA8510", maleic anhydride modified ethylene-α olefin copolymer (maleic anhydride modified ethylene-1-butene copolymer formed by modifying ethylene-1-butene copolymer which has main chain structure formed by copolymerization of ethylene as main monomer and 1-butene as comonomer, with maleic anhydride)

Acid-Modified Polyolefin Acid-Modified SEBS: manufactured by Kraton Polymer Japan Co., Ltd., "KRATON_FG1901X", maleic anhydride modified styrene-ethylene/butylene-styrene copolymer Calcium Carbonate Particles Ca Carbonate (average particle diameter of 1.7 μm): manufactured by Nitto Funka Kogyo K. K., "NCC P"

Calcium Carbonate Particles Ca Carbonate (average particle diameter of 1.0 μm): manufactured by Nitto Funka Kogyo K. K., "NCC P#2300"

Silicone-Based Compound Silicone MB (PE/silicone gum): manufactured by Shin-Etsu Chemical Co., Ltd., "X-22-2125H", a compound obtained by kneading low density polyethylene and silicone gum formed of dimethyl polysiloxane at a ratio of 1:1 (mass ratio) to prepare a master batch Fatty Acid-Containing Compound Magnesium Stearate: manufactured by ADEKA CORPORATION, "AFCO CHEM MGS", magnesium stearate Antioxidant Antioxidant MB (EVA/antioxidant): manufactured by Dainichiseika Color & Chemicals Mfg. Co., Ltd., "C-174•2A", a compound obtained by kneading ethylene-vinyl acetate copolymer resin and antioxidant at a ratio of 1:0.15 (mass ratio) to prepare a master batch The description of "3/3", etc. for the blending amount of silicone MB (PE/silicone gum) in Table 1 and 2 means the blending of 3 parts by mass of low density polyethylene and 3 parts by mass of silicone gum formed of dimethylpolysiloxane. Similarly, the description of "2/0.3" for the blending amount of antioxidant MB (EVA/antioxidant) in Table 1 and 2 means the blending of 2 parts by mass of ethylene-vinyl acetate copolymer resin and 0.3 part by mass of antioxidant. In the present examples and comparative examples, the low density polyethylene and the ethylene-vinyl acetate copolymer resin blended as a master batch constitute a part of the base resin.

Subsequently, sheet shaped molded articles, covered electric wire samples, and optical fiber cable samples were made from the flame retardant resin composition obtained according to the method described below, for these samples, each evaluation of mechanical properties (breaking strength, elongation, hardness, tearing property), low temperature characteristic (brittle temperature), and flame retardancy (acceptance rate of 60 degree inclining combustion test, combustion time of 60 degree inclining combustion test). The results are shown in Table 1 and 2.

TABLE 1

Table 1

| | | | Example 1 | Example 2 | Example 3 | Example 4 | Example 5 | Example 6 |
|---|---|---|---|---|---|---|---|---|
| Compounding | High Density Polyethylene | HDPE | 20 | 40 | 75 | 80 | 40 | 40 |
| | Low Density Polyethylene | LDPE1 | 65 | 45 | 10 | — | 50 | 35 |
| | | LDPE2 | — | — | — | 10 | — | — |
| | Acid-Modified Polyolefin | Acid-Modified PE | 10 | 10 | 10 | 5 | 5 | 20 |
| | | Acid-Modified SEBM | — | — | — | — | — | — |
| | Calcium Carbonate Particles | Ca Carbonate (Average particle diameter 1.7 μm) | 70 | 70 | 70 | — | 70 | 70 |
| | | Ca Carbonate (Average particle diameter 1.0 μm) | — | — | — | 70 | — | — |
| | Silicone-Based Compound | Silicone MB (PE/Silicon Gum) | 3/3 | 3/3 | 3/3 | 3/3 | 3/3 | 3/3 |
| | Fatty Acid-Containing Compound | Magnesium Stearate | 5 | 5 | 5 | 5 | 5 | 5 |
| | Antioxidant | Antioxidant MB (EVA/Antioxidant) | 2/0.3 | 2/0.3 | 2/0.3 | 2/0.3 | 2/0.3 | 2/0.3 |
| Evaluation | Mechanical Properties | Breaking Strength [MPa] | 20.2 | 18 | 14.8 | 13.4 | 18.2 | 18.9 |
| | | Elongation Rate [%] | 630 | 630 | 617 | 622 | 625 | 640 |
| | | Hardness | 51 | 55 | 58 | 59 | 54 | 53 |
| | | Tearability [N] | 10.7 | 9.8 | 9.3 | 9 | 9.4 | 10.3 |
| | Low Temperature Characteristic | Embrittlement temperature [° C.] | −50 | −50 | −35 | −30 | −40 | −40 |
| | Flame Reratdancy | Acceptance Rate of 60 degree incling combustion test [%] | 100 | 100 | 100 | 100 | 100 | 100 |
| | | Combustion Time of 60 degree incling combustion test [second] | 47 | 44 | 46 | 41 | 43 | 47 |

| | | | Example 7 | Example 8 | Example 9 | Example 10 | Example 11 |
|---|---|---|---|---|---|---|---|
| Compounding | High Density Polyethylene | HDPE | 40 | 40 | 40 | 40 | 40 |
| | Low Density | LDPE1 | 45 | 45 | 45 | 45 | 45 |

TABLE 1-continued

Table 1

| | | | | | | | |
|---|---|---|---|---|---|---|---|
| | Polyethylene | LDPE2 | — | — | — | — | — |
| | Acid-Modified Polyolefin | Acid-Modified PE | 10 | 10 | 10 | 10 | — |
| | | Acid-Modified SEBM | — | — | — | — | 10 |
| | Calcium Carbonate Particles | Ca Carbonate (Average particle diameter 1.7 μm) | 30 | 100 | 70 | — | 70 |
| | | Ca Carbonate (Average particle diameter 1.0 μm) | — | — | — | 70 | — |
| | Silicone-Based Compound | Silicone MB (PE/Silicon Gum) | 3/3 | 3/3 | 3/3 | 3/3 | 3/3 |
| | Fatty Acid-Containing Compound | Magnesium Stearate | 5 | 5 | 3 | 5 | 5 |
| | Antioxidant | Antioxidant MB (EVA/Antioxidant) | 2/0.3 | 2/0.3 | 2/0.3 | 2/0.3 | 2/0.3 |
| Evaluation | Mechanical Properties | Breaking Strength [MPa] | 27.5 | 15 | 20 | 19.1 | 16 |
| | | Elongation Rate [%] | 640 | 615 | 640 | 631 | 591 |
| | | Hardness | 53 | 56 | 54 | 54 | 53 |
| | | Tearability [N] | 11.3 | 8.3 | 9.3 | 9.6 | 9.6 |
| | Low Temperature Characteristic | Embrittlement temperature [° C.] | −40 | −30 | −50 | −35 | −50 |
| | Flame Reratdancy | Acceptance Rate of 60 degree incling combustion test [%] | 100 | 100 | 100 | 100 | 100 |
| | | Combustion Time of 60 degree incling combustion test [second] | 47 | 41 | 41 | 31 | 42 |

TABLE 2

Table 2

| | | | Comparative Example 1 | Comparative Example 2 | Comparative Example 3 | Comparative Example 4 | Comparative Example 5 |
|---|---|---|---|---|---|---|---|
| Com-pounding | High Density Polyethylene | HDPE | 80 | 15 | 40 | 40 | 40 |
| | Low Density Polyethylene | LDPE1 | 5 | 70 | 45 | 45 | 47 |
| | | LDPE2 | — | — | — | — | — |
| | Acid-Modified Polyolefin | Acid-Modified PE | 10 | 10 | 10 | 10 | 10 |
| | | Acid-Modified SEBM | — | — | — | — | — |
| | Calcium Carbonate Particles | Ca Carbonate (Average particle diameter 1.7 μm) | 70 | 70 | 20 | 120 | 70 |
| | | Ca Carbonate (Average particle diameter 1.0 μm) | — | — | — | — | — |
| | Sillcone-Based Compound | Silicone MB (PE/Silicon Gum) | 3/3 | 3/3 | 3/3 | 3/3 | 1/1 |
| | Fatty Acid-Containing Compound | Magnesium Stearate | 5 | 5 | 5 | 5 | 5 |
| | Antioxidant | Antioxidant MB (EVA/Antioxidant) | 2/0.3 | 2/0.3 | 2/0.3 | 2/0.3 | 2/0.3 |
| Eval-uation | Mechanical Properties | Breaking Strength [MPa] | 12.4 | 23.1 | 30.2 | 13.7 | 19.4 |
| | | Elongation Rate [%] | 588 | 635 | 690 | 565 | 625 |
| | | Hardness | 60 | 49 | 50 | 56 | 55 |
| | | Tearability [N] | 9.2 | 11.5 | 13.5 | 8.4 | 9.3 |
| | Low Temperature Characteristic | Embrittlement temperature [° C.] | −20 | −60 | −60 | −20 | −60 |
| | Flame Reratdancy | Acceptance Rate of 60 degree incling combustion test [%] | 100 | 100 | 100 | 100 | 60 |
| | | Combustion Time of 60 degree incling combustion test [second] | 51 | 42 | 58 | 39 | 65 |

<Preparation of Sheet Shaped Molded Articles>

The flame retardant resin composition obtained was kneaded for 15 minutes at 160° C. by a BANBURY mixer. Subsequently, the flame retardant resin composition was molded using a molding die. Therefore, sheet shaped molded articles having a thickness of 1 mm and sheet shaped molded articles having a thickness of 2 mm were obtained.

<Preparation of Covered Electric Wire Samples>

The flame retardant resin composition obtained was kneaded for 15 minutes at 160° C. by a BANBURY mixer. Subsequently, the flame retardant resin composition was put into a single screw extruder (L/D=20, screw shape: full flight screw, manufactured by Marth Seiki Co., Ltd.), was extruded as a tubular extrudate from the extruder. Therefore, the conductor (Number of wire 1/cross section area 2 mm²) was covered with the flame retardant resin composition having a thickness of 0.7mm. Therefore, the covered electric wire samples were obtained.

<Preparation of Optical Fiber Cable Samples>

The flame retardant resin composition obtained was kneaded for 15 minutes at 160° C. by a BANBURY mixer. Subsequently, the flame retardant resin composition was put into a single screw extruder (L/D=20, screw shape: full flight screw, manufactured by Marth Seiki Co., Ltd.), was extruded as a cylindrical extrudate having sectional shape shown in FIG. 1 from the extruder. Therefore, an optical fiber core wire 1 was covered with the flame retardant resin composition formed into a shape having a short diameter of 1.6 mm, a major diameter of 2.0 mm, and a distance between the tear notch and the optical fiber of 0.4 mm. Therefore, the optical fiber cable samples were obtained. FIG 1 is a diagram showing a cross-sectional shape of the optical fiber cable sample produced in the present example.

<Measurement of Breaking Strength and Elongation>

Sample of No. 3 dumbbell shape was made from the sheet shaped molded articles having a thickness of 1 mm, obtained as described above. By conducting a tensile test in accordance with JIS C3005, breaking strength and elongation at break were measured. When measuring, tension rate was set to 200mm/min, gauge spacing was set to 20 mm, the number of measurements was set to 5, the average value of the five measurement results was adopted as the measurement value.

<Measurement of Hardness>

Sample with the size of vertical 20 mm×horizontal 50 mm was made from the sheet shaped molded articles having a thickness of 2 mm, obtained as described above. Shore D hardness was measured by durometer (type D) in accordance with JIS K7215. When measuring, the number of measurements was set to 5, the average value of the five measurement results was adopted as the measurement value. In the present example, a case where the shore D hardness was 50 or more was determined to be acceptable.

<Tearing Property>

The optical fiber cable sample (refer to FIG. 1) obtained as described above was used, in advance, the portion between the pair of notches of jacket of the optical fiber cable sample was teared in a few cm. The ends of a pair of parts teared of the jacket were fixed with a chuck, were teared by 200 mm at tension rate of 500 mm/min, the tearing force was measured at this time. When measuring, the number of measurements was set to 5, the average value of the five measurement results was adopted as the measurement value. In the present example, a case where the tearing force was 12N or less was determined to be acceptable.

<Low Temperature Property>

Sample with the size of vertical 6 mm×horizontal 38 mm was made from the sheet shaped molded articles having a thickness of 2 mm, obtained as described above. Impact resistance test at low temperature was conducted in accordance with JIS C3005. The impact resistance test was conducted on condition that temperature was lowered from 0° C. by 5° C. increments, the minimum temperature when cracks did not occur on the surface of the sheet after impact was set to the embrittlement temperature. In the present example, a case where the embrittlement temperature was −30° C. or less was determined to be acceptable.

<Flame Retardancy (Acceptance Rate of 60 Degree Inclining Combustion Test, Combustion Time of 60 Degree Inclining Combustion Test)>

The 60 degree inclining combustion test was conducted on the covered electric wire sample obtained as described above in accordance with JIS K3005. The 60 degree inclining combustion test was conducted on ten covered electric wire samples, where the extinguishing time was within 60 seconds was determined to be acceptable. The acceptance rate of 10 covered electric wire samples was calculated and the average of the extinguishing time of ten covered electric wire samples was calculated to be set to the combustion time of 60 degree inclining combustion test. The extinguishing time means the time from immediately after the termination of contact with flame (immediately after separating the flame of burner from the electric wire) to exhibiting self-extinguishment. The shorter the extinguishing time is, the higher the flame retardancy is. When, the contact with flame was conducted within 30 seconds until the covered wire sample ignited. In the present example, a case where the acceptance rate was 100% was determined to be acceptable.

<Evaluation>

From the results shown in Table 1, it could be found that the flame retardant resin compositions of Examples 1 to 11 met predetermined requirements of one or more embodiments of the present invention were compositions which have high hardness, excellent easily tearing property, excellent low temperature resistance, and excellent flame retardancy.

Comparing Example 2 with Example 11, in the case that the maleic anhydride-modified ethylene-α olefin copolymer was used as the acid-modified polyolefin compound, it could be found that the breaking strength and elongation of the flame retardant resin composition could be improved while making the flame retardant resin composition high hardness and excellent easily tearing property, excellent low temperature resistance, and excellent flame retardancy.

On the other hand, as shown in Table 2, in Comparative Example 1 in which the ratio of low density polyethylene was too small, the low temperature resistance (embrittlement temperature) was inferior.

In Comparative Example 2 in which the ratio of the high density polyethylene was too small, the hardness was lowered.

In Comparative Example 3 in which the ratio of the calcium carbonate particles was too small, the easily tearing property was inferior.

In Comparative Example 4 in which the ratio of the calcium carbonate particles was too large, the low temperature resistance (embrittlement temperature) was inferior.

In Comparative Example 5 in which the ratio of the silicone-based compound was too small, the flame retardancy was inferior.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claim.

The invention claimed is:

1. A flame retardant resin composition consisting essentially of:
   a base resin comprising 18 to 85% by mass of a high density polyethylene, 9 to 69% by mass of a low density polyethylene, and 3 to 25% by mass of a maleic anhydride modified ethylene-α olefin copolymer, and
   25 parts by mass to 110 parts by mass of calcium carbonate particles, more than 1 part by mass to 10 parts by mass of a silicone-based compound, and 2 parts by mass to 20 parts by mass of a fatty acid-containing compound, each on the basis of 100 parts by mass of the base resin.

2. The flame retardant resin composition according to claim 1, wherein the maleic anhydride modified ethylene-α olefin copolymer is maleic anhydride modified ethylene-1-butene copolymer.

3. The flame retardant resin composition according to claim 1, wherein a density of the high density polyethylene is 945 kg/m$^3$ or more, and a density of the low density polyethylene is from 880 kg/m$^3$ to 925 kg/m$^3$.

4. The flame retardant resin composition according to claim 1, wherein the silicone-based compound is a silicone gum.

5. The flame retardant resin composition according to claim 1, wherein the fatty acid-containing compound is magnesium stearate.

6. An optical fiber cable comprising an optical fiber and an insulating layer covering the optical fiber, wherein the insulating layer is composed of the flame retardant resin composition according to claim 1.

7. A cable comprising a conductor and an insulating layer covering the conductor, wherein the insulating layer is composed of the flame retardant resin composition according to claim 1.

8. The flame retardant resin composition according to claim 1, wherein the content of the maleic anhydride modified ethylene-α olefin copolymer is 5 to 20% by mass.

9. The flame retardant resin composition according to claim 1, wherein the average particle diameter of the calcium carbonate particles is from 0.7 μm to 3.6 μm.

* * * * *